United States Patent [19]

Beagley

[11] 4,094,296
[45] June 13, 1978

[54] PORTABLE ADJUSTABLE OUTDOOR COOKING ACCESSORY

[76] Inventor: George Beagley, 7545 W. 3100 South, Magna, Utah 84044

[21] Appl. No.: 777,345

[22] Filed: Mar. 14, 1977

[51] Int. Cl.² .............................................. F24B 3/00
[52] U.S. Cl. ..................................................... 126/30
[58] Field of Search ................ 126/25 A, 25 AA, 29, 126/30

[56] References Cited

U.S. PATENT DOCUMENTS

| | | | |
|---|---|---|---|
| 2,940,439 | 6/1960 | Bartels | 126/25 A |
| 3,152,536 | 10/1964 | Lucas | 126/30 |

Primary Examiner—Robert G. Nilson
Attorney, Agent, or Firm—Trask & Britt

[57] ABSTRACT

A portable adjustable outdoor cooking accessory has a stake member with a sharpened point at its lower end and a flange extending substantially normal to the axis of the stake member at its upper end. An adjustment member is rotatably adapted to the upper end of the stake member by adapting means. The adjustment member has a plurality of apertures formed to coact with a pin to adjust the positioning of an elongated arm pivotally secured to the adjustment member. The elongated arm has a handle on one end and a hook suspended from the other end to receive a link chain. The link chain has a hook suspended from its lower end to receive cooking utensils including a bar having means at approximately its midpoint to adapt to the lower end hook. Suspension members are suspended from opposite ends of the bar and have troughs formed along their lower ends to receive the elongated portions of handles secured to a grill suspended therebetween.

12 Claims, 8 Drawing Figures

PORTABLE ADJUSTABLE OUTDOOR COOKING ACCESSORY

BACKGROUND OF THE INVENTION

1. Field

This invention relates to devices for cooking food out of doors. More particularly, this invention provides for a portable adjustable accessory for cooking food out of doors.

2. State of the Art

The increasing popularity of outdoor activities such as camping has brought increased attention to the problems of open fire grilling or cooking. That is, outdoor cooking over an open fire which may be made of coals, wood or similar combustible substances, has attained some measure of popularity in recent years. However, rugged and reliable apparatus to assist the outdoorsman in preparing food over an open fire is not known.

Cooking over an open fire can be regarded as difficult because of the problems of controlling the proximity of food to the fire and concomitantly cooking temperatures of the food. The problem is complexified by the different kinds of food (e.g., eggs, meats, pancakes) and different cooking methods (e.g., frying, grilling, roasting). A variety of "make-do" or "make-the-best-of-it" techniques are known. Indeed, some relatively complex and ostensibly expensive apparatus have been devised to assist generally in camp fire cooking. However, a simple portable and rugged device to assist the outdoorsman or camper in all forms of outdoor open fire cooking is not known.

The devices which are known to be intended for outdoor cooking are complex and expensive and may be regarded as lacking in durability. They are generally unsuitable and inconvenient to use. For example, three inventions to Lucas U.S. Pat Nos. 2,912,973; 3,067,734; and 3,152,536) disclose a portable barbecue (grill) with improvements thereon. It may be noted that the grill device of Lucas is particularly complex having numerous moving parts and close fitting parts which require reasonably close machining to manufacture. It should be noted that in the environment of an open fire, residue from the smoke evolving from the fire will build up on the apparatus and inhibit the proper functioning of moving parts. Further, a typical material of construction for the devices of Lucas would be iron or iron alloys; and it is known that many of such materials suffer increased corrosion when exposed to an open fire. Also, devices such as those disclosed by Lucas are hot and sooty after use; and in the outdoor environment, one would tend to leave them outside to cool, to avoid cleaning or for reuse. Thus, it would over time corrode even further as it becomes exposed to rain, dew and the elements. Thus, the complex devices of Lucas would suffer corrosion which would inevitably inhibit proper functioning. Indeed, the absence of durability suggests that Lucas'devices are not particularly suitable for outdoor use. This is particularly so in the circumstances where such a device by virtue of its complex construction must be regarded as comparatively expensive.

It should also be noted that the devices disclosed by Lucas rely on a fire bucket or pan to which it is to be adapted in order to maintain vertical stability. Such a pan is particularly undesirable for outdoor campers and the like because it requires additional space which in the outdoor camping environment is typically at a premium. It also is undesirable because such a pan would tend to be dirty, corroded (after use) and otherwise generally unsuitable for adaption to the open fire fireplaces and the like provided at some governmentally operated campsites and otherwise typically available to the camper or outdoorsman.

The device disclosed by Tallaksen U.S. Pat. No. 3,162,113) is similarly unsuitable for outdoor use for virtue of the fact that it similarly has a fire pan and is more particularly adapted for use with an indoor fireplace. The device disclosed by Bartels et al U.S. Pat. No. 2,940,439) is also unsuitable by virtue of an array of hand operated nuts, bolts and other adjustment devices associated with its operation and use.

Indeed, it appears that there is a need for a strong, durable and portable yet effective adjustable cooking accessory that may be used in a variety of different environments by a camper or outdoorsman.

SUMMARY OF THE INVENTION

A portable adjustable cooking accessory is comprised of a stake member which has a first end formed into a point and a second end formed with a flange extending substantially normal to the longitudinal axis of the stake member. An adjustment member is rotatably adapted to the stake member by adapting means. The adjustment member is comprised of a first plate which has a plurality of apertures formed in it in accordance with a preselected pattern to coact with a pin sized to fit through the apertures. An elongated arm member is pivotally secured to the plate and hs a handle on one end and a first hook adapted to its other. A chain having links is sized to coact with the first hook. It is adjustably hung from the first hook. A second hook is adapted to the lower end of the chain from which cooking utensils may be suspended.

In one embodiment, the adapting means is comprised of a spindle which extends axially away from the upper end of the stake member and which has a shoulder bearing. A sleeve to which the adjustment member is adapted is sized to fit over the spindle and abut the shoulder bearing. In another embodiment, a hollow sleeve is secured to the upper end of the stake member to extend axially away therefrom. An insert member is sized to fit within the hollow sleeve member. It is adapted to an extension member to which the adjustment member is secured. The lower surface of the extension member and the upper end of the sleeve member coact as bearing surfaces.

In another embodiment, a rod, which has means to suspend it from te second hook at about the midpoint of the rod, has a grill member suspended therefrom by suspension means. Preferably, the grill has a flat grill surface and a pair of handles symmetrically adapted thereto. The handles have an elongated member substantially parallel to the plane of the grill surface to coact with suspension means which include a suspension member suspended from opposite ends of the rod with each of the suspension members having an elongated trough formed along its respective lower end to receive the elongated member of the grill handles. The suspension members may also have apertures formed therein to rotatably receive an elongated spit.

In a preferred embodiment, the adjustment member includes a second plate substantially parallel to the first plate and spaced apart therefrom with the elongated arm member pivotally mounted therebetween. The second plate has apertures formed therein corresponding to the apertures formed in the first plate to receive the pin. The apertures are preferably formed substantially equidistant from each other in two substantially adjacent spaced apart rows in which the apertures of the respective rows are misaligned. The rows of apertures are positioned between the handle of the elongated arm and the pivot point of the elongated arm. In a highly preferred embodiment, the cooking accessory is made of a strong ferrous metal. In particular, it is preferred that the stake member, flange and elongated arm be made from thick strap iron.

BRIEF DESCRIPTION OF THE DRAWINGS

In the drawings, which illustrate what is presently regarded as the best mode for practicing the invention.

DESCRIPTION OF THE ILLUSTRATED EMBODIMENT

Figure 1:
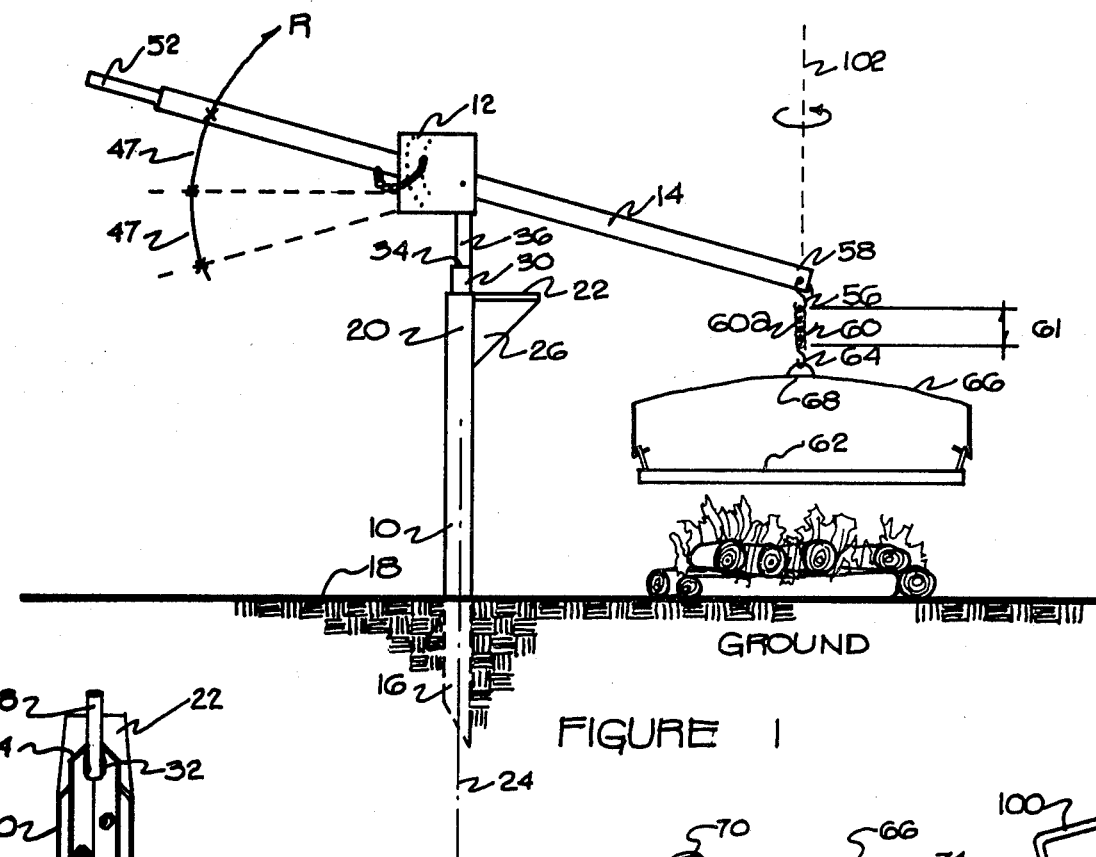
FIG. 1 is a side view of a portable adjustable cooking accessory of the instant invention.

FIG. 1 illustrates a portable adjustable cooking accessory of the instant invention. It includes a stake member 10, an adjustment member 12 and an elongated arm 14. The stake member 10 has a sharpened or pointed end 16 to facilitate its insertion into the ground 18. The other end 20 of the stake member 10 has a flange 22 formed to extend substantially normal to the axis 24 of th stake member 10. An angular throat member 26 is positioned between the flange 22 and the stake member 10 to reinforce the flange 22 with respect to downward motion.

Figure 2:
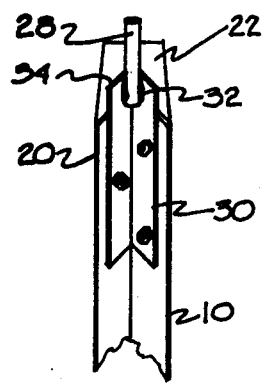
FIG. 2 is a partial perspective view of the upper portion of a stake member of a partable adjustable cooking accessory of the instant invention.

Referring now to FIG. 2, it can be seen that the stake member 10 is preferably fabricated from thick (about ¼ inch) angle iron to provide rugged strength and durability. At the upper end 20 of the stake member 10, a spindle member 28 is secured to extend away from the flange 22 along the axis 24 of the stake member 10. As here shown, the spindle member 28 is secured to a smaller piece of angle iron 30 by tack welds 32. In turn, the smaller piece of angle iron 30 is bolted to the stake member 10. However, it may be noted that other means may be used to secure the spindle member to the upper end 20 of the stake member 10. As best shown in FIG. 2, the smaller piece of angle iron is positioned along the stake member 10 so that it extends beyond the flange 22. The upper surface 34 of the smaller angle iron 30 acts as a shoulder bearing to support the sleeve 36 and adjustment member 12 as more fully discussed hereinafter.

Figure 3:
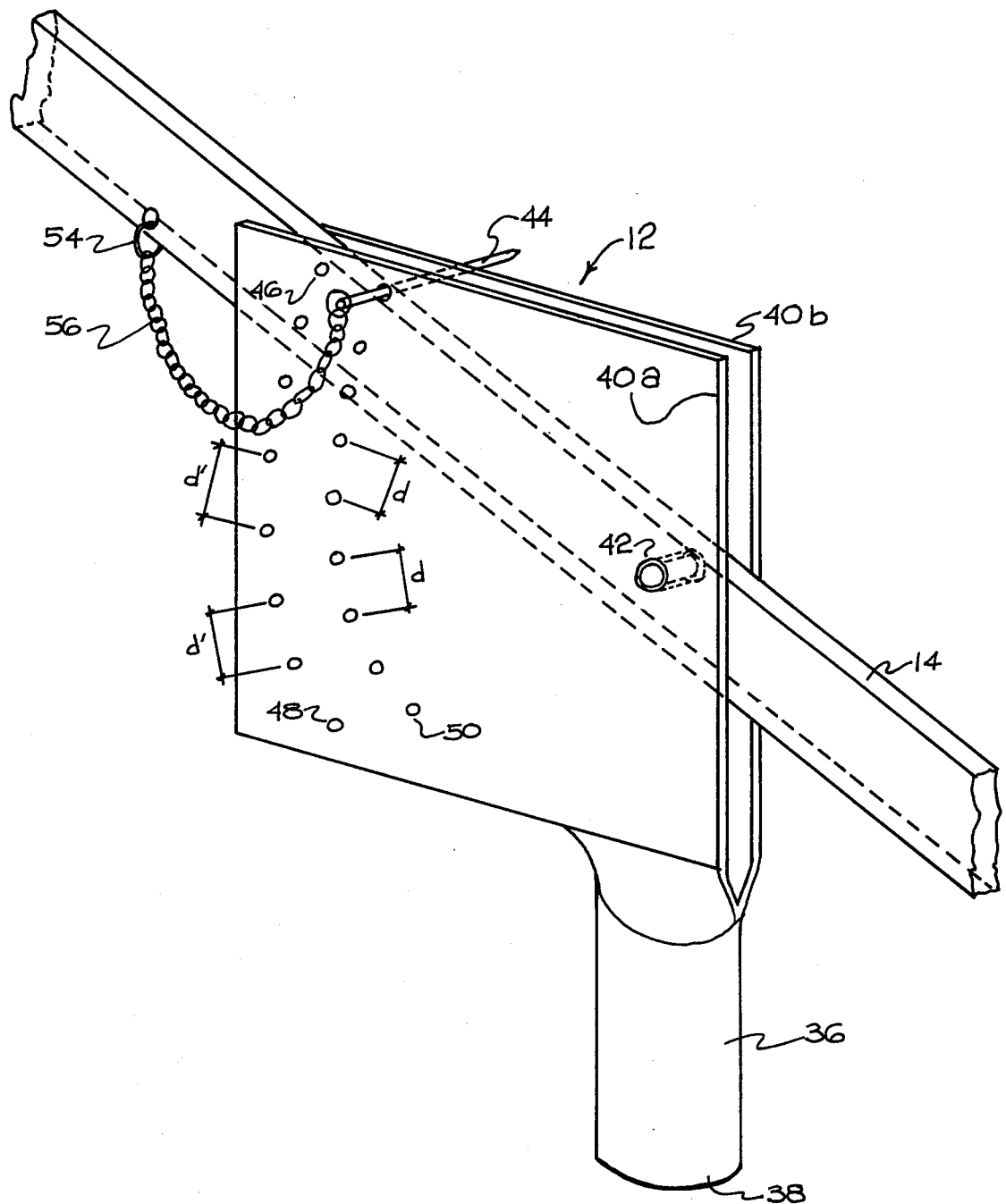
FIG. 3 is a partial perspective view of the adjustment member of the portable adjustable cooking accessory of the instant invention.

Referring now to FIG. 3, the adjustment member 12 is shown with the elongated arm 14 pivotally secured thereto. As here shown, the adjustment member 12 is adapted to a sleeve 36 which is sized to fit over the spindle 28. The bottom end 38 of the sleeve rotatably abuts the shoulder 34 (FIG. 2) to support the sleeve 36 and adjustment member 12. The adjustment member 12 as shown is comprised of two plates 40a and 40b which are substantially parallel and spaced apart to permit free movement of the elongated arm 14 pivotally secured therebetween. As shown, the elongated arm 14 is pivotally mounted to the plates by a hinge pin 42. Both plates 40a, 40b have a plurality of apertures 46 formed therein to coact with a pin 44 to provide for adjustment of the angle 47 of the elongated arm 14 with respect to the ground 18 as more fully discussed hereinafter.

As depicted in FIG. 3, the apertures 46 are formed in the plates 40a and 40b in accordance with a preselected pattern which is preferably two adjacent rows 48 and 50 of apertures 46. In the individual rows 48 and 50, the apertures 46 are substantially equidistant ($d$, $d'$) from each other. The apertures 46 in the rows 48 and so are misaligned rather than radially aligned so that each aperture in each row 48, 50 provides a unique angle 47 for the elongated arm 14 when the pin 44 is inserted. The apertures 46 in the separate rows 48 and 50 are positioned between the pivot point 42 of the elongated arm 14 and the handle 52 of the elongated arm 14. It may also be noted that in FIG. 3 the pin 44 is shown being secured to the arm 14 by a ring 54 and chain 56 to avoid inadvertent loss.

Figure 4:
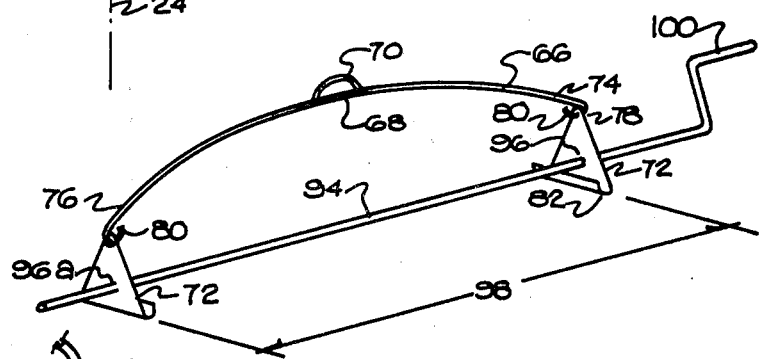
FIG. 4 is a perspective view of a cooking utensil of a portable cooking accessory of the instant invention which includes a bar with suspension members suspended from its opposite ends.
Figure 7:
FIG. 7 is a partial perspective view of a portion of a chain for use with the portable adjustable cooking accessory of the instant invention.
Figure 5:
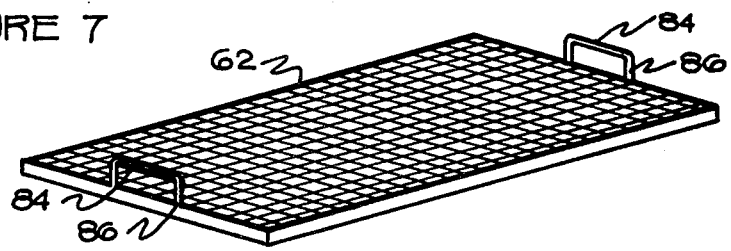
FIG. 5 is a perspective view of the grill unit for suspension from the suspension members shown in FIG. 4.

Referring back to FIG. 1, it may be noted that the elongated arm 14 has a handle 52 on one end and a hook 56 adapted to its other end 58. A chain 60 sized to cooperate with the hook 56 is suspended from the hook 56 as best shown in FIG. 7. The chain 60 weights the hook end 58 so that the arm 14 tends to rotate in a clockwise direction as shown by arrow R in FIG. 1. The chain 60 provides for vertical height adjustment of the grill 62 because the individual linds 60a of the chain 60 can be suspended from the hook 56 to vary the length 61 of the chain 60. At the lower end of the chain 60 another hook 64 is provided from which a bar 66 is suspended. The bar 66 has means at approximately its midpoint 68 to permit it to be suspended from the lower hook 64. As best shown in FIG. 4, the bar 66 has a "D" ring 70 secured preferably by tack wells at its midpoint 68 so that it may be suspended from the lower hook 64. The grill 62 is in turn suspended from the bar 66 by suspension means which, as shown in FIG. 4, is comprised of a suspension member 72 adapted to the opposite ends 74 and 76 of the bar 66. The suspension member 72 as shown is preferably a thin relatively durable metal plate having an aperture 78 formed at its top to coact with a hook 80 formed at the opposite ends 74 and 76 of the bar 66. The suspension member 72 is formed to have a trough 82 at its lower end. The trough 82 is elongated to receive the elongated portion 84 of handles 86 (FIG. 5) which are symmetrically positioned and secured to the grill 62.

Figure 6:
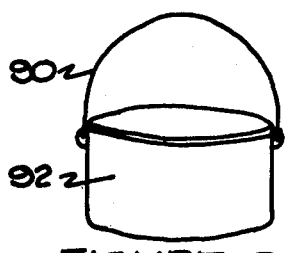
FIG. 6 is a perspective view of a cooking utensil.

It may be observed that virtually every type of outdoor cooking (e.g., frying, grilling, roasting and the like) may be efficiently and effectively accomplished using the accessory as above described. For example, a variety of pots, kettles and ovens having handles or bails 90 as shown for the pot 92 depicted in FIG. 6, may be conveniently suspended from the lower hook 64. Further, frying pans, kettles and other cooking utensils may be readily positioned on the grill 62. Roasting may be effected on the grill 62 or by placing food (e.g., a meat roast) on a spit 94 which may be inserted through appropriately sized apertures 96 formed in the suspension members 72. The spit 94 is preferably substantially longer (e.g., about 8 inches to about 20 inches) than the distance 98 between the suspension members 72 so that means need not be provided to prevent the spit 94 from accidentally slipping out of, for example, aperture 96a. Further, the spit 94 is elongated to allow its handle 100 to be removed from the fire area for accessability and to keep it as cool as possible to minimize the user's exposure to burned fingers.

In operation, the stake member 10 is positioned near the place of intended use of the portable adjustable accessory of the instant invention. Thereupon a striking device such as a hammer or mallet is used to strike the flange 22 and thereupon drive the pointed end 16 of the stake member 10 into the ground a sufficient distance to provide the stake member 10 with vertical stability. Of course in rocky soil or in very hard soil, this may prove difficult. In that event, the angle iron structure for the stake member 10 allows the user to readily provide a structure of rocks, logs or the equivalent to provide adequate vertical stability. Thereafter the sleeve 36 and adjustment member 12 preassembled with the elongated arm 14 and hook 56 are positioned over the spindle member 28 as shown in FIG. 1. A selected line 60a of the chain 60 is then hooked to the upper hook 56; and a desired cooking device is hooked to the lower hook 64. For example, the bar 66 may be suspended from the lower hook 64. The handles 86 of the grill 62 may then be placed in the trough 82 of the suspension members 72. The vertical height 88 of the grill 62 (or other cooking utensil) above the heat source (fire) may be adjusted by adjusting the length 61 of the chain 60 by hooking a different link 60a of the chain 60 over the upper hook 56. The height 88 may further be adjusted by moving the handle 52 of the arm 14 and inserting the pin 44 into an appropriate hole 46 in one of the two rows 48 and 50 in the adjustment member 12. In this way, the height 88 of the grill 62 (or other utensil) above the fire or heat source may be adjusted as desired by the user to efficiently effect the method of cooking desired. It may be noted that the adjustment member 12 and elongated arm 14 together with the grill 62 may be rotated 360° without encumbrance about the axis 24 of the stake member 10 by virtue of the spindle 28 and sleeve and the bearing arrangement between the lower end of the sleeve 36 and the shoulder 34. Such a feature permits assembly and cooking operations to be effected away from the fire by simply rotating the arm 14. Further, the feature permits cooking temperature control in addition to the height adjustment feature. It also permits the user to position cooking food away from the smoke if desired. Further, food may be removed from a cooking utensil away from the fire to minimize discomfort to the user.

It should be understood that use of the elongated troughs 82 is association with the elongated portion 84 of the handle 86 provides sufficient stability to the grill 62 to preclude tipping or the like so that food placed thereon may be randomly distributed across the grill 62 particular concern for precise balance.

It may also be noted that in the process of cooking in the outdoor environment over a fire, uneven cooking of food may occur if the food is not rotated from tiem to time to take into account the frequently uneven horizontal heat distribution generation of the fire. Of course, the food can be rotated as above noted to take into account the uneven heat distribution in and about the general fire area. However, the devices of the instant invention reduce the need for food rotation solely because of uneven heat distribution by providing a chain which can be made to oscillate about a vertical axis 102 by simply twisting the chain and allowing the grill 62 to gently rotate or oscillate about the axis 102. Eventually the chain 60 and in turn the grill 62 will come to rest in a particular azimuth with respect to the vertical axis 90. That azimuth can be changed about 90° from time to time by placing a different link 60a of the chain 60 over the hook 56. As best seen in FIG. 7, the links 60a and 60b of chain 60 are basically oriented 90° to each other. Accordingly, when each is placed over the hook 56 their respective at rest positions in azimuth for the grill 62 (or other cooking utensil) will be offset approximately 90° with respect to each other.

Figure 8:
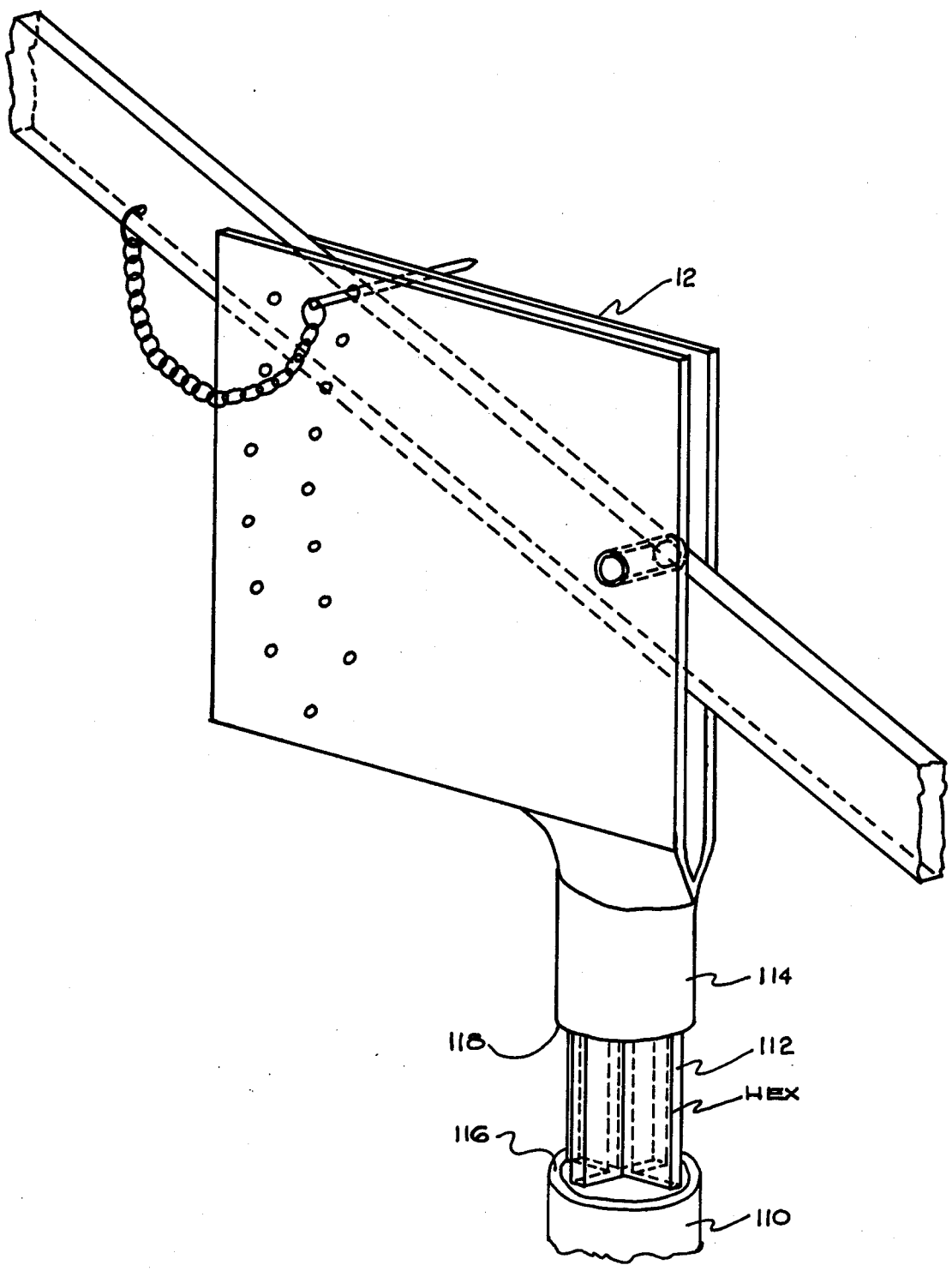
FIG. 8 is a partial perspective view of an adjustment member and adapting means of the portable adjustable cooking accessory of the instant invention.

Referring to FIG. 8, a preferred arrangement for adapting the adjustment member 12 to the stake member 10 is depicted. First adapting means is shown as a hollow sleeve 110 which is secured to the upper end 20 of the stake member 10 similar to the spindle 28 (FIG. 2). Second adapting means is shown comprised of an insert member 112 and extension member 114. The insert member 112 is sized to rotatably fit within the sleeve member 110. The insert 112 is shown as being 'X' shaped in cross-section. However, it may be any shape as convenient to the user. The insert 112 is adapted at its upper end to the extenson member 114. The adaption may be mechanical cooperation or securing, including welding and bolting. However, preferably the extension member 114 and insert member 112 are formed as a single piece in the fabrication process (e.g., casting). The upper surface 116 of the sleeve member 110 and the lower surface 118 of the extension member coact as bearing surfaces when the insert member 112 is fully inserted into the sleeve 110. The screen surface 62 (FIG. 5) may be replaced by bars or by a solid surface to form a griddle.

It is to be understood that the embodiments of the invention described herein are merely illustrative of the application of the principals of the invention. Reference herein to details of the illustrated embodiment is not intended to limit the scope of the claims which themselves set forth those features as regarded as essential to the invention.

I claim:

1. A portable adjustable cooking accessory comprising:

a stake member having a first end formed into a point and a second end formed with a flange extending substantially normally to the longitudinal axis of said stake member;

first adapting means secured to the second end of said stake member to extend axially away therefrom;

second adapting means removably and cooperatively associated with said first adapting means to permit said second adapting means to rotate about said axis;

an adjustment member secured to said second adapting means, said adjustment member being comprised of a first plate having a plurality of apertures formed therein in accordance with a preselected pattern;

a pin sized to coact with said apertures for removable positioning in a selected aperture;

an elongated arm member pivotally secured to said plate and having a handle on one end and a first hook adapted to its other end;

a chain having links sized to coact with said first hook;

a second hook adapted to one end of said chain to extend below said first hook; and a cooking utensil suspended from said second hook.

2. The accessory of claim 1 wherein said adjustment member includes a second plate substantially parallel to said first plate and spaced apart therefrom with said elongated arm member pivotally mounted therebetween, said second plate having apertures formed therein corresponding to the apertures formed in said first plate to receive said pin.

3. The accessory of claim 2 wherein said first adapting means is a spindle member secured to the second end of said stake member to extend axially away therefrom and having a shoulder bearing positioned therealong, and wherein said second adapting means is a sleeve member sized to fit over said spindle member and abut said shoulder bearing.

4. The accessory of claim 2 wherein said first adapting means is a hollow sleeve member secured to the second end of stake member to extend axially away therefrom, said sleeve member having a substantially flat top surface to act as a bearing surface, and wherein said second adapting means is an insert member which is sized rotatably to fit within said hollow sleeve member and which is adapted to an extension member having a lower bearing surface to coact with the bearing surface of said sleeve member, said adjustment member being secured to the top of said extension member.

5. The accessory of claim 4 wherein said cooking utensil is a cooking device having a bail to suspend it from said second hook.

6. The accessory of claim 4 wherein said cooking utensil is a rod having means to suspend it from said second hook at about the midpoint of said rod and a grill member with suspension means to suspend said grill member from said rod.

7. The accessory of claim 6 wherein said grill member has a flat grill surface and a pair of handles symmetrically secured thereto wherein each of said handles has an elongated member substantially parallel to the plane of said flat grill surface, and wherein said suspension means includes a suspension member suspended from opposite ends of said rod, each of said suspension members having an elongated trough along its lower end to receive the elongated member of said grill handles.

8. The accessory of claim 7 wherein each of said suspension members have an aperture formed therein to receive an elongated spit.

9. The accessory of claim 8 wherein said apertures are formed substantially equidistant from each other in two substantially adjacent rows.

10. The accessory of claim 9 wherein said rows are positioned between said handle of said elongated arm and said pivot point of said elongated arm.

11. The accessory of claim 10 made of a strong ferrous metal.

12. The accessory of claim 10 wherein said stake member and flange are made from thick strap angle iron.

* * * * *